J. HANSEN.
AXLE ATTACHMENT FOR AUTOMOBILES.
APPLICATION FILED DEC. 10, 1915. RENEWED NOV. 2, 1916.
1,227,611.  Patented May 29, 1917.
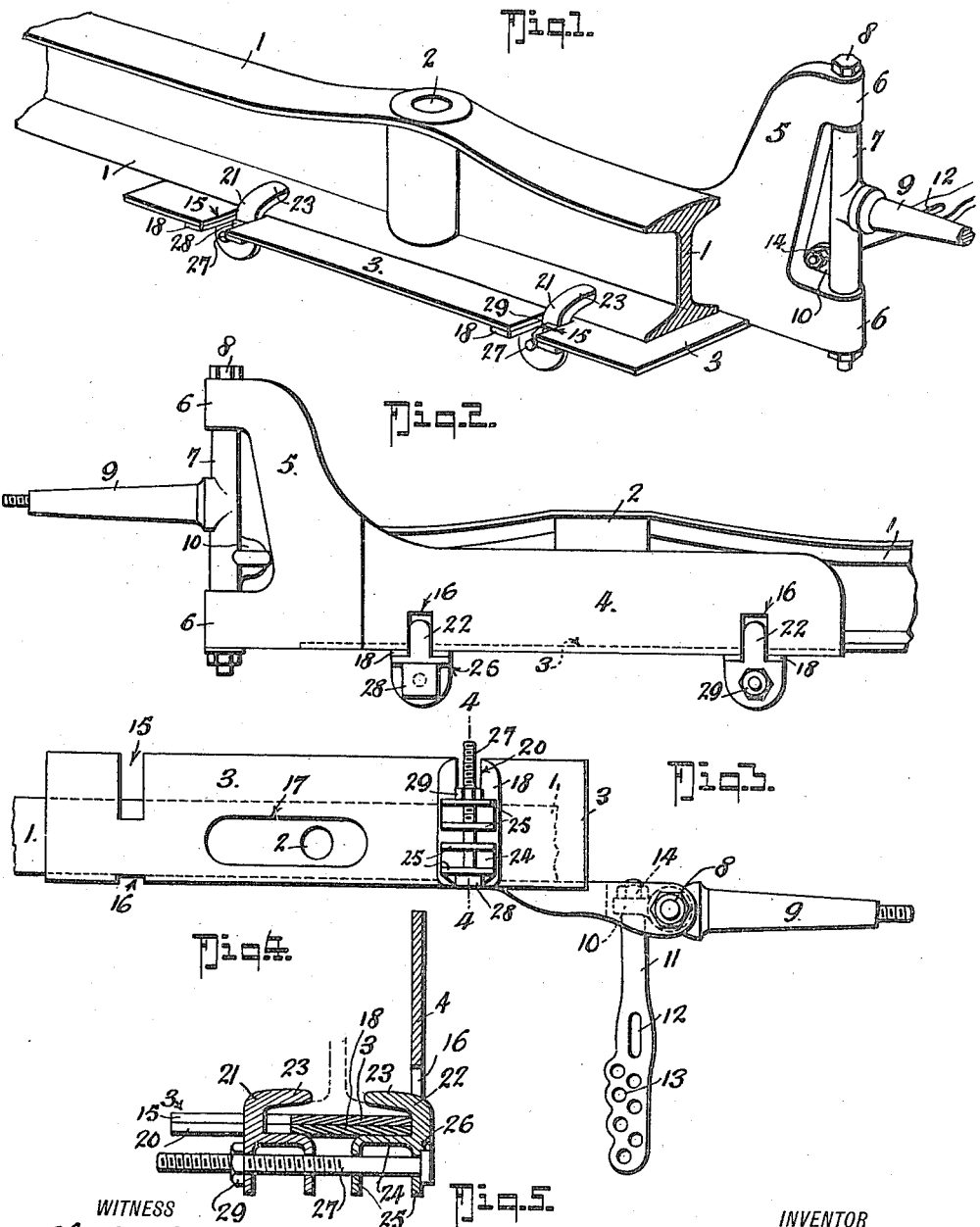

UNITED STATES PATENT OFFICE.

JOHAN HANSEN, OF TONOPAH, NEVADA.

AXLE ATTACHMENT FOR AUTOMOBILES.

1,227,611.      Specification of Letters Patent.      Patented May 29, 1917.

Application filed December 10, 1915, Serial No. 66,115. Renewed November 2, 1916. Serial No. 129,231.

*To all whom it may concern:*

Be it known that I, JOHAN HANSEN, residing at Tonopah, in the county of Nye and State of Nevada, have invented a new and Improved Axle Attachment for Automobiles, of which the following is a specification.

My invention is an improvement in emergency repair devices and the invention primarily has for its object to provide a device for effecting a repair, especially of the front axle of a motor vehicle when the axle breaks in back of the knuckle bracket. Frequently, the front axle of an automobile will break off more or less close to one of the wheels and in order to convey the vehicle from the place of accident to a repair shop, the axle must be jacked up and an emergency truck placed under the same. This is inconvenient, takes considerable time and an emergency truck is not always available. Hence it is an object of my invention to provide an attachment that can be quickly secured to the front axle and to which the wheel may be applied and the vehicle run under its own power, the device being of a nature that can be carried conveniently in the tool box or elsewhere so as to always be at hand when occasion for its use arises.
In its general nature, the invention comprises an L body having a spindle bracket in which a wheel spindle is mounted in the usual way, and provided with the usual arm to which the connecting rod of the steering gear may be fastened, the attachment being designed to be secured to either end of the axle, right or left, as required; quick acting clamp devices are also provided for clamping the attachment to the front axle.
In its more subordinate nature, the invention includes those novel features of construction, combination and arrangement of parts, all first fully described, then specifically pointed out in the appended claims and illustrated in the accompanying drawing, in which:

Figure 1 is a perspective view of a portion of a broken axle with the invention applied.

Fig. 2 is a side elevation of the same.
Fig. 3 is an inverted plan view of the invention applied to an axle end, one of the clamps being removed to show the clamp slots.

Fig. 4 is a cross section on the line 4—4 of Fig. 3.

Fig. 5 is a detail plan view of one of the clamp spacer plates.

In the drawing, 1 represents the front axle which is usually of the I beam type and is sometimes provided with a portion 2 for the reception of the spring shackle bracket bolt (on Ford cars and the like having the transverse front spring suspension).

In order to supply a temporary spindle arrangement for the broken axle 1, I have provided a body which consists of the bottom plate 3 and the side plate 4 preferably integrally formed as an L beam, the side plate 4 being provided with the spindle bracket 5 having bearings 6 for the spindle pivot bolt 8 and between which bearings 6 the spindle bearing sleeve 7 is located. 9 is the wheel spindle on which the wheel is mounted in the usual way (not shown). The spindle bearing sleeve 7 has an ear 10 to which the arm 11 is secured as at 14, the arm 11 having a series of apertures 13 to which the connecting rod (not shown) of the steering gear is adapted to be coupled, and 12 indicates a slot in which the speedometer post may be secured.

The base 3 is provided with slots 15 entering from one side and short slots 16 at the other side, the slots 16 extending up in the side 4, as indicated best in Figs. 2 and 4 to permit introduction of the fingers 23 of the clamp member 22. It will be noticed that the short slots 16 extend back the thickness of the metal of the side 4 so as to be flush with the side edge of the base of the axle 1.

17 is a slot provided in the base 4 to register with the bore of the enlargement 2 so that the spring shackle bracket bolt may be passed through the same.

18 is a spacer plate or shim which has a short slot 19 and a long slot 20, so as to register with the slots 15 and 16 respectively, the plate 18 being designed for insertion between the base portions 24 of the clamp members 22 and the web of the axle when such web is of a thin nature or the plate 18 may be omitted when the web is thicker.

The clamp members 21—22 are essentially of the same construction, which includes fingers 23 for gripping the axle and base portions 24 from which ears 25 depend, the ears 25 being apertured to permit passage of the bolt 27. One of the clamp members 22 has a shoulder 26 to engage the head 28 of the bolt, and hold it from turning while the nut 29 is secured home to insure the clamping pressure required.

In practice, if the left hand end of the axle breaks off the device may be attached as shown in Fig. 1, with the plate 4 lying in back of the axle, that would bring the spindle 9 to the rear of the axial alinement and hence the connecting rod of the steering gear would be connected in one of the holes 13 nearest to the axle, while, on the other hand, if the right hand end of the axle is broken, the plate 4 would lie against the front of the axle and the arm 11 would be secured to project in a direction opposite to that shown in Fig. 3, and the connecting rod of the steering mechanism would be secured to one of the outermost apertures 13, as will be understood by those skilled in the art.

From the foregoing taken in connection with the accompanying drawing, the complete construction, operation and advantages of my invention will be readily understood by those skilled in the art.

I claim—

1. A device of the class described comprising an L body formed of a base and a side web section, said base having transverse slots, axle grippers movable in said slots and projecting below the base, a screw device for drawing said grippers together to clamp the base to the axle, a spindle bracket projecting from the web and having bearings, a spindle having a sleeve mounted between said bearings, a spindle bolt passing through said bearings and sleeve and an arm connected with said sleeve for attachment to the steering gear.

2. A device of the class described comprising an L body formed of a base and a side web section, said base having transverse slots, axle grippers movable in said slots and projecting below the base, a screw device for drawing said grippers together to clamp the base to the axle, a spindle bracket projecting from the web and having bearings, a spindle having a sleeve mounted between said bearings, a spindle bolt passing through said bearings and sleeve, an arm connected with said sleeve for attachment to the steering gear, said base having an elongated slot extending in the length of the base.

3. A device of the class described comprising an L body formed of a base and a side web section, said base having transverse slots, axle grippers movable in said slots and projecting below the base, a screw device for drawing said grippers together to clamp the base to the axle, a spindle bracket projecting from the web and having bearings, a spindle having a sleeve mounted between said bearings, a spindle bolt passing through said bearings and sleeve, an arm connected with said sleeve for attachment to the steering gear, and a spacer plate inserted between said base and said clamp members, said spacer plate having slots corresponding to the base slot.

4. A device of the class described comprising an L body formed of a base and a side web section, said base having transverse slots, axle grippers movable in said slots and projecting below the base, a screw device for drawing said grippers together to clamp the base to the axle, a spindle bracket projecting from the web and having bearings, a spindle having a sleeve mounted between said bearings, a spindle bolt passing through said bearings and sleeve, an arm connected with said sleeve for attachment to the steering gear, said base having an elongated slot extending in the length of the base, and a spacer plate inserted between said base and said clamp members, said spacer plate having slots corresponding to the base slot.

5. In a device of the character described, a base plate and a side plate extending upwardly from the same, a spindle bracket projecting from said side plate at one end thereof, a spindle mounted in said bracket, said base plate having transverse slots, said side plate having slots registering with those of the base plate, and clamp members for securing said base plate to the axle, said clamp members comprising flat portions opposing the base plate, fingers extending up from said base portion and adapted to extend over the base flange of the axle, ears dependent from said base portions of said clamp members and apertured, a clamp bolt passed through said apertured ears, a nut on said bolt, one of said clamp members having a shoulder to engage the bolt head and hold it from turning.

JOHAN HANSEN.